Patented Nov. 18, 1952

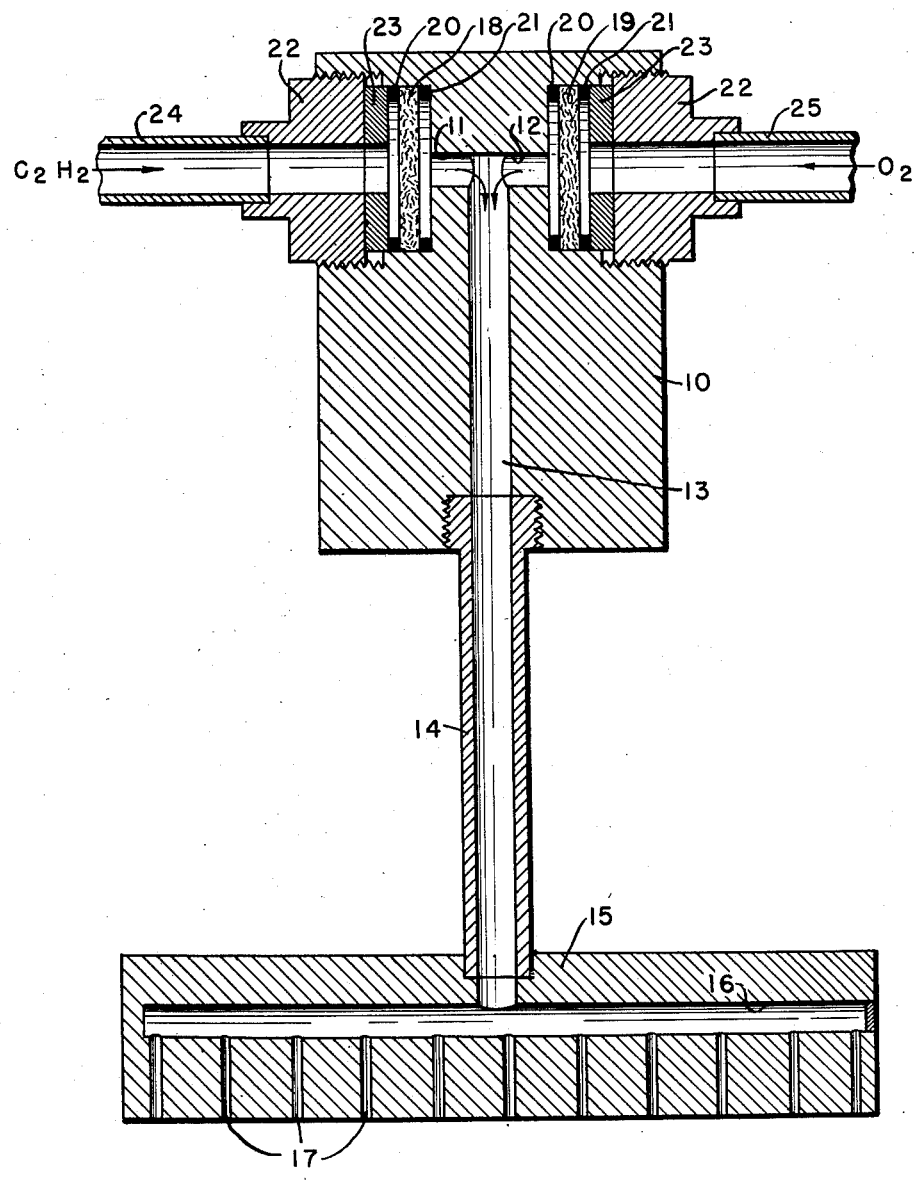

2,618,540

UNITED STATES PATENT OFFICE 2,618,540

GAS MIXER

John Teti, Plainfield, N. J., assignor to Air Reduction Company, Incorporated, a corporation of New York Application September 30, 1949, Serial No. 118,978

5 Claims. (Cl. 48—180)

This invention relates to gas mixers, especially for oxyacetylene gas-burning apparatus such as cutting and welding torches, flame hardening apparatus, etc.

Heretofore, it has been necessary to develop a special mixer fo reach type of apparatus, with considerable care being given in the design to the problem of flame stability. If a piece of apparatus produces an unstable flame, frequent backfiring is likely to occur, and while backfires in themselves are not so serious, they are likely to result in more dangerous and destructive flashbacks, i. e., a continued burning of the gas mixture at some point within the apparatus upstream of the discharge orifice where the mixture is supposed to burn. It has therefore been necessary in designing the gas mixer for each type of apparatus to take into consideration the conditions peculiar to that type of apparatus and design the gas mixer accordingly, with a view to eliminating, so far as possible, flashbacks in that type of apparatus.

It is the principal object of this invention to provide a universal type of gas mixer that is suitable for use with a wide variety of gas-burning apparatus, and at the same time will make each piece of apparatus flashback proof, although not necessarily backfire proof.

One type of gas mixer which will achieve this object is disclosed in copending application Serial No. 82,314, filed jointly by L. D. Conta and myself on March 19, 1949. Broadly, the gas mixer there disclosed has a body portion provided with two separate inlets for the gases to be mixed and also provided with an outlet through which the mixed gases are discharged. Within the body portion there is a mixing region for the gases and there is provided at least one passage in the form of a narrow slot interposed between each gas inlet and the mixing region.

The gas mixer of this invention also has a body portion provided with two separate inlets for the gases to be mixed, an outlet through which the mixed gases are discharged, and a mixing region for the gases intermediate the inlets and outlet, but within each inlet upstream of the mixing region there is positioned a porous block through which gas entering the mixer through the inlet must pass prior to its reaching the mixing region.

The principle on which the mixer here disclosed operates is very similar to that on which the mixers of the above-mentioned copending application operate and is as follows: When the mixer is incorporated in a piece of gas-burning apparatus, such as an oxyacetylene burner, with the separate gas inlets of the mixer properly connected to oxygen and acetylene supply conduits and the outlet of the mixer properly connected to the burner tip so that the gas mixture is fed to the flame or flames of the burner, and a backfire occurs, all of the mixed gases in the system burn with explosive rapidity thus creating a rapid increase in pressure within the mixer, forcing the burning mixed gases upstream through the mixing region and through the porous blocks into the gas supply conduits where they completely burn if not already burned. As soon as the pressure in the mixer subsides, the burned gases are forced downstream through the porous blocks by incoming fresh gases. By being passed through the porous blocks, the burned gases are cooled and deactivated in the small tortuous passages of the blocks. The burned gases, thereby cooled, then purge the mixing region and the downstream passages in the apparatus of hot active products of combustion. Fresh oxygen and acetylene following the cooled burned gases down through the mixing region do not ignite upon mixing, since no active or hot gas is present to ignite the mixture, and therefore no flashback occurs and the fresh mixture may be reignited at the discharge face of the burner. By "active products of combustion" is meant dissociated products such as free atoms and free radicals that release energy on recombining and which are capable of reigniting the mixture of fresh gases if not properly deactivated. One way of deactivating these so-called "chain carriers" is by promoting their collision with walls of the tortuous passages in the porous blocks and with each other.

The improved gas burner is illustrated in the accompanying drawing in conjunction with a multiflame burner tip of the general type that might be used in a descaling operation.

Referring to the drawing, the gas mixer illustrated therein comprises a body portion 10 having inlets 11 and 12 for the gases to be mixed, such as oxygen and acetylene. The body portion also has an outlet 13 through which the mixture of the two gases is discharged to the burner. Outlet 13 and particularly its upper portion where the inlets 11 and 12 join it forms a mixing region for the gases. The burner comprises a mixed gas inlet conduit 14 and multiflame tip 15. The gas conduit 14 is threaded into the outer end of outlet 13 of the mixer, the connection being made gas tight. The multiflame tip has a distributing manifold 16 and a plurality of discharge passages 17.

The outer portions of the inlets 11 and 12 are enlarged to provide recesses for accommodating porous blocks 18 and 19. Each porous block is clamped in its recess between gaskets 20 and 21 by a centrally bored threaded plug 22 and centrally bored spacer 23. Gas supply conduits 24 and 25 are sealed, respectively, into the outer ends of the central bores of the plugs, one being adapted to supply acetylene to the mixer, while the other is adapted to supply oxygen thereto. The gaskets 20 and 21 prevent gas leakage around the porous blocks and also space each block from the walls of the parts which retain it to expose the major portion of the surface of the block to the gas stream.

It can thus be seen that each gas supplied to the gas mixer must pass through a porous block prior to any mixing with the other gas. When the mixture is being used, as with the multiflame burner tip disclosed, and a backfire occurs, the burning gas mixture will be forced upstream through the mixing region, through the porous blocks 18 and 19, and possibly into the oxygen and acetylene conduits leading to the inlets of the mixer. When the burning gas mixture that has been forced upstream of the porous blocks burns out, as it will in a very short time because a continued burning cannot take place due to the fact that a combustible gas mixture is not formed until the gases reach the mixing region, the pressure caused by the backfire subsides and the burned gases are forced downstream again by the fresh incoming oxygen and acetylene, and as they pass back through the blocks, they are cooled and deactivated by contact with the walls of the tortuous passages in the blocks. As they emerge from the porous blocks these burned gases no longer have sufficient energy to reignite the fresh gases that follow them down to the mixing region. They also purge the downstream passages in the apparatus of the hot active products of combustion and serve as a buffer to prevent contact between these hot products of combustion and the fresh gas mixture. Thus the fresh gas mixture does not come in contact with any active or hot gas capable of igniting it, so no flashback occurs.

The porous blocks 18 and 19 may be made from various materials. One such material that has been used successfully is so-called "Porex," a commercially used product made by metal-to-metal bonding together of small bronze spheres. The spheres are carefully graded and the final sintered product is a metal of controlled porosity. Grade 1 Porex, which is the coarsest commercial grade and has interstices between the particles of the order of .002 to .005 inches, has been used successfully even though a flame will propagate through it. The fact that a flame will propagate through the blocks used is not disadvantageous for there is a porous block in each gas inlet and no fresh gas mixture exists upstream of either block to be ignited by any flame that propagates back through the block. The burning gas forced upstream through the mixer by a backfire merely burns out as it passes upstream through and beyond the porous blocks. The thickness of the blocks used and dimensions of the surface area exposed to the gas flowing therethrough are determined largely by gas flow requirements and the size of the passages through the block. The thickness used is a compromise between physical strength requirements and the pressure drop sustained. Grade 1 Porex of ⅛ to ½ inch in thickness has been found very satisfactory for use, the other dimensions of the blocks used being variable, depending upon the amount of gas required to be passed through them.

Other commercially available materials, such as porous stainless steel, or an electrically fused aluminum oxide product, known as "Aloxite" have been used and serve satisfactorily. Undoubtedly, many other porous materials could be used satisfactorily. In addition to limited passage size, the principal requisites of the material used for the porous blocks are that it be non-inflammable, have reasonably uniform internal passages, and have reasonably good thermal conductivity and resistance to thermal shock. Though it is not definitely settled, it is believed theoretically that the surface action, that is, the collision of active gas particles with passage walls and with each other, is more important in the deactivation of the gases than the heat loss due to the conductivity of the porous material.

Many structural changes might be made in the mixer illustrated and described without departing from the invention, the essential feature being that the porous blocks are located in the inlets of the mixer upstream of the point at which the incoming gases meet and are mixed.

I claim:

1. A gas mixer comprising a body portion having separate inlets for a plurality of gases to be mixed within the body portion and further having an outlet through which mixed gases are discharged, said body portion also having a gas mixing region intermediate the inlets and the outlet, and a block of porous material in each inlet upstream of said mixing region whereby the gases to be mixed must pass through the porous blocks prior to reaching said mixing region, substantially all of the interstices of said porous material having diameters of the order of .002 to .005 inches and of such size that on a backfire, reverse flow of a substantial amount of the active products of combustion will flow through the porous blocks and be deactivated so that they will not ignite the mixture of incoming fresh gases when they reach the mixing region after the backfire and the deactivated products of combustion act as a buffer to prevent ignition of such fresh mixture of gases by any still-active products of combustion downstream of the deactivated products of combustion.

2. A gas mixer as set forth in claim 1 in which the porous blocks are made of porous stainless steel.

3. A gas mixer as set forth in claim 1 in which the porous blocks are made of electrically-fused aluminum oxide particles.

4. A gas burner system comprising a mixer and a burner, said mixer having a fuel gas inlet, a combustion-supporting gas inlet, a mixing chamber and a mixed gas outlet communicating with said burner, a porous block of sintered metal particles with substantially all of the interstices between said particles of from about .002 to .005 inch interposed between said fuel gas inlet and said mixing chamber, and a porous block of sintered metal particles with substantially all of the interstices between said particles of from about .002 to .005 inch interposed between said combustion-supporting gas inlet and said mixing chamber, whereby on a backfire, reverse flow of a substantial amount of the active products of combustion will flow through the porous blocks and be deactivated so that they will not ignite the mixture of incoming fresh gases when they reach the mixing region after the backfire and the deactivated products of combustion act as a buffer to prevent ignition of such fresh mixture of gases by any still-active products of combustion downstream of the deactivated products of combustion.

5. A gas burner system as defined in claim 4 in which the sintered metal particles are bronze.

JOHN TETI.

REFERENCES CITED

The following references are of record in the file of this patent:

UNITED STATES PATENTS

| Number | Name | Date |
|---|---|---|
| 713,421 | Fouche | Nov. 11, 1902 |
| 1,497,197 | Schroeder | June 10, 1924 |
| 2,447,048 | Baker | Aug. 17, 1948 |
| 2,447,086 | Olson et al. | Aug. 17, 1948 |